July 26, 1966   E. F. BRILL ET AL   3,263,104
APPARATUS FOR GENERATING ELECTRICAL ENERGY
Filed Feb. 13, 1961
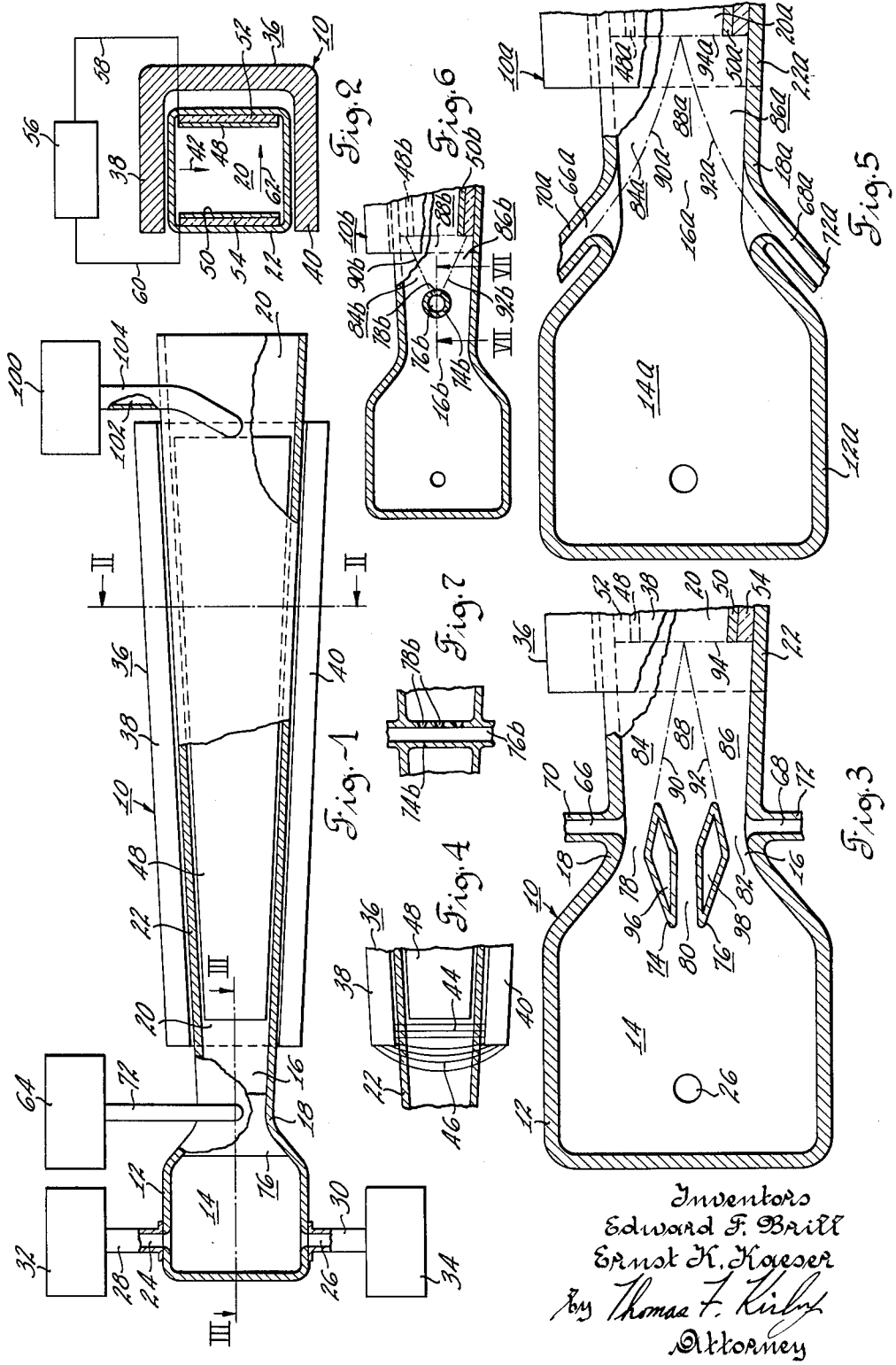
Inventors
Edward F. Brill
Ernst K. Kaeser
By Thomas F. Kirby
Attorney "United States Patent Office"

3,263,104
Patented July 26, 1966

3,263,104
APPARATUS FOR GENERATING ELECTRICAL ENERGY
Edward F. Brill, Brookfield, and Ernst K. Kaeser, West Allis, Wis., assignors to Allis-Chalmers Manufacturing Company, Milwaukee, Wis.
Filed Feb. 13, 1961, Ser. No. 88,703
4 Claims. (Cl. 310—11)

This invention relates generally to apparatus for generating electrical energy by moving electrically conductive fluid through a magnetic field.

More particularly it relates to means for improving the operating efficiency of such apparatus through control of the concentration and dispersion of so-called "seeding" material which is added to a stream of hot fluid to render it electrically conductive.

One type of magnetohydrodynamic (MHD) electrical generator comprises an elongated conduit, means for establishing a magnetic flux field transverse to the longitudinal axis of the conduit, and spaced apart electrodes within the conduit orientated so that the shortest path between them is transverse to the longitudinal axis of the conduit and transverse to the lines of force of the magnetic flux field. Due to the fact that the upstream and downstream terminal regions of the magnetic flux field are characterized by diminishing field strength, it is preferable that the electrodes be shorter than the magnetic flux field and coextensive with the strongest and most uniform portion thereof.

When an electrically conductive fluid is moved at high velocity through the magnetic flux field in the conduit, electrical current flow is generated in the fluid between the electrodes in accordance with Fleming's well known "Right Hand Rule." In practice, the fluid is usually a hot gas which is produced by burning fuel reactants together in a combustion chamber. Such hot gas is not ordinarily sufficiently electrically conductive to produce the desired electrical effect but it can be made so by the addition of seeding material thereto, i.e., those materials, such as the alkali metals, which ionize readily when heated to predetermined high temperatures by the hot gas. Potassium or cesium or various chemical compounds thereof are examples of seeding materials which can be employed in powdered form, in the gaseous or liquid state, or dissolved in solutions. The seeding material may be added to the fuel reactants during combustion or added to the stream of hot gas upstream of the electrodes and magnetic flux field.

In electrical generators of the aforedescribed type, so-called "end loss" effects occur which account for a substantial loss (on the order, for example, of 20%) in the amount of electrical power being produced. The end loss effect is actually a short circuit condition occurring in the conductive mixture of hot gas and ionized seeding material in the upstream and downstream regions of diminishing field strength of the magnetic flux field. Theoretically, end loss effects would vanish and maximum efficiency would be obtainable if the gas were conductive only while passing through the magnetic flux field between the electrodes. As a practical matter, however, heating of the gas and seeding must necessarily take place upstream of the electrodes and magnetic flux field. Efforts to reduce end loss effects by disposing sets of spaced apart stationary dielectric barriers transversely across the gas stream in the regions where end losses normally occur have not met with complete success. Such means are not highly efficient and, because of the quantity and configuration of the barriers needed, would tend to interfere with gas flow through the duct. Accordingly, it is desirable to employ other approaches for reducing or overcoming end loss effects in MHD electrical generators.

It is an object of this invention to provide improved means for reducing or overcoming end loss effects in MHD electrical generators through control of the injection, concentration, dispersion and effectiveness of seeding material added to the fluid stream therein with respect to the magnetic flux field and electrodes.

Another object is to provide improved means of the aforesaid character which insure that the mixture of fluid and seeding material of greatest electrical conductivity is disposed principally between the electrodes when the MHD generator is in operation.

Another object is to provide means of the aforesaid character which permit introduction of the seeding material into the fluid stream upstream of the magnetic flux field and electrodes.

Another object is to provide improved means for adding seeding material to the fluid stream in an MHD generator upstream of the magnetic flux field and electrodes and for controlling its dispersion through the fluid stream so that it does not become effectively dispersed therethrough until it reaches the vicinity of the upstream ends of the electrodes.

Another object is to provide improved means for rendering the seeded fluid stream in an MHD electrical generator substantially nonconductive when it reaches the vicinity of the downstream ends of the electrodes.

Another object is to provide an improved MHD electrical generator having means for admitting seeding material into a hot fluid stream in a conduit upstream of the magnetic flux field and electrodes having means within the conduit for deflecting the flow of such seeding material so that it is dispersed unevenly through the conduit until it reaches the vicinity of the upstream ends of the electrodes, and having means for introducing cooling material into the seeded fluid stream in the vicinity of the downstream ends of the electrodes to cool the fluid in that region and thus render the fluid stream substantially nonconductive.

Other objects and advantages of the invention will hereinafter appear.

The accompanying drawing illustrates several preferred embodiments of the invention but it is to be understood that the embodiments illustrated are susceptible of modifications with respect to details thereof without departing from the scope of the appended claims.

In the drawing:

FIG. 1 is an elevational view of an elementary type of MHD electrical generator incorporating one embodiment of the present invention with portions broken away to illustrate details;

FIG. 2 is a cross sectional view taken along the line II—II of FIG. 1;

FIG. 3 is an enlarged cross sectional view of a portion of the MHD electrical generator taken along the line III—III of FIG. 1;

FIG. 4 is an elevational view of portions of the upstream ends of the magnet poles and electrodes shown in FIG. 1 illustrating diagrammatically the pattern of the magnetic flux field thereat;

FIG. 5 is a view similar to FIG. 3 but showing another embodiment of the invention;

FIG. 6 is a view similar to FIGS. 3 and 5, but in a reduced scale, showing another embodiment of the invention; and FIG. 7 is a cross sectional view of a portion of the embodiment shown in FIG. 6, taken along the line VII—VII of FIG. 6.

Referring to FIGS. 1, 2 and 3, the numeral 10 designates an MHD electrical generator incorporating a first embodiment of the present invention. The generator 10 comprises a burner 12 having a combustion chamber 14 therewithin which is connected through a throat 16 in a transition section 18 to a passage 20 in a conduit section 22.

Burner 12 is adapted to afford a supply of hot gas for passage 20 of conduit section 22. As FIG. 1 shows, combustion chamber 14 of burner 12 is connected through the passages 24 and 26, respectively, in the tubes 28 and 30, respectively, to the sources 32 and 34, respectively, of pressurized fuel and combustion air, respectively. Although a wide variety of fuels or fuel reactants could be employed to afford a suitable supply of hot gas assume, for example, that a fossil fuel, such as powdered coal or oil, is employed and that it produces a gas initially heated to about 5400° F. If preferred, means other than those shown could be employed to provide a supply of hot gas, which gas need not necessarily be a product of combustion. For example, helium could be employed if provisions were made to raise it to the high temperature and high velocity required.

Generator 10 further comprises a permanent magnet 36 for establishing a magnetic flux field of predetermined length in passage 20 in conduit section 22 transverse to the longitudinal axis of the latter. Permanent magnet 36 comprises a pair of elongated poles 38 and 40 which are disposed, respectively, above and below conduit section 22. It may be assumed for purposes of illustration that the poles 38 and 40 are north and south, respectively, and that consequently they generate a magnetic flux field in passage 20 in the direction of an arrow 42, shown in FIG. 2.

FIG. 4 schematically depicts the magnetic lines of force that are understood to exist at the upstream end of magnet 36. The magnetic lines of force 44 directly between the poles 38 and 40 of magnet 36 are substantially straight, whereas the magnetic lines of force 46 very near and beyond the ends of the poles are curved and are understood to represent a region of diminishing magnetic field strength. It is to be understood that a similar region of diminishing magnetic field strength exists near and beyond the downstream ends of the poles 38 and 40 of magnet 36. It is in these two regions of diminishing magnetic field strength that end losses, hereinafter described, normally occur.

It is to be understood that, although a permanent magnet 36 is shown, suitable electromagnetic means (not shown) or even induction coils (not shown) could be employed to generate the necessary magnetic field in passage 20 in conduit section 22.

Generator 10 also comprises a pair of spaced apart, electrically conductive members or electrodes 48 and 50 for collecting electrical power produced in the generator. The electrodes 48 and 50 are disposed on opposite inside walls of conduit section 22 and are electrically insulated therefrom by suitable insulating members 52 and 54, respectively. The electrodes 48 and 50 are orientated so that a normal path between them is transverse to the longitudinal axis of the conduit section 22 and is transverse to the direction of the magnetic flux field existing in passage 20 of the conduit section. The electrodes 48 and 50 preferably are shorter, lengthwise, than the predetermined length of the magnetic flux field in passage 20 of conduit section 22 and are disposed with respect to the field so as to be coextensive with the strongest portion of the field, as FIGS. 1 and 4 make clear. Thus, the end losses that normally occur in an MHD generator of the type disclosed herein, would occur upstream and downstream of the upstream and downstream ends, respectively, of the electrodes 48 and 50. As FIG. 2 schematically shows, the electrodes 48 and 50 are adapted for electrical connection to a suitable load 56 by conductor wires 58 and 60, respectively. It is to be understood that due to the orientation of the magnetic flux field and the direction of gas flow through passage 20 of conduit section 22, electrical current flow through the gas in passage 20 is in the direction of an arrow 62, shown in FIG. 2, although, it is to be understood, actual electron flow is in the opposite direction.

FIGS. 1 and 3 show that a source 64 of seeding material is connected by passages 66 and 68 in tubes 70 and 72, respectively, to throat 16 in transition section 18 upstream of the magnetic flux field and the electrodes 48 and 50. It may be assumed, for example, that the seeding material employed is pressurized cesium gas, although it is to be understood that other seeding materials which ionize readily at the temperatures involved could be employed instead. Furthermore, depending upon their nature, seeding materials could be introduced as gases, liquids or finely divided solids.

In accordance with the first embodiment of the present invention, throat 16 in transition section 18 of generator 10 is provided with a pair of spaced apart stationary vanes, airfoils or members 74 and 76 which are disposed opposite the mouths of the passages 66 and 68, respectively. As FIG. 3 shows, each vane has an airfoillike cross sectional configuration and each is disposed so that the longitudinal axis thereof is substantially parallel to the path of the magnetic flux field and is transverse to the normal path between the electrodes 48 and 50. The vanes 74 and 76 are of such size, shape and disposition so as to be adapted to control the direction of flow of hot gas moving therepast and to control by deflection the direction of flow of the seeding material being supplied from source 64. Spaces 78, 80 and 82 for accommodating the flow of hot gas from combustion chamber 14 of burner 12 exist between one side of transition section 18 and vane 74, between the vanes 74 and 76, and between the other side of transition section 18 and vane 76, respectively. The hot gas moving through the spaces 78 and 82 mixes with the seeding material being supplied to those respective spaces and the electrically conductive mixture, principally because of the cross sectional configuration of the vanes 74 and 76 and other aerodynamic factors, and is dispersed into regions designated by the numerals 84 and 86, respectively. Simultaneously, the hot gas moving through space 80 is not immediately mixed with seeding material and, consequently, maintains an electrically nonconductive region designated by the numeral 88 between the conductive regions 84 and 86. For purposes of illustration, nonconductive region 88 is shown as being generally wedge shaped and bounded by planes having edges depicted by dotted lines 90 and 92. While the particular configuration of nonconductive region 88 is not important, it is important that the region be coextensive with the upstream region of diminishing magnetic field strength and that it terminates substantially at the plane in which the upstream ends of the electrodes 48 and 50 terminate; such plane having an edge depicted by a dotted line 94 in FIG. 3. Because of the extremely high temperatures involved, it may be desirable to provide the vanes 74 and 76 with chambers 96 and 98, respectively, which are adapted to accommodate the flow therethrough of liquid or other coolants to prevent the vanes from melting.

FIG. 1 shows that in further accordance with the present invention, a source 100 of cooling material is connected through a passage 102 in a tube 104 to passage 20 in conduit section 22 beyond but as close as is practical to the downstream end of electrode 50. The cooling material is introduced under pressure into passage 20 in conduit section 22 at this location to cool the electrically conductive mixture of hot gas and seeding material sufficiently to render the mixture nonconductive or reduce its conductivity as it moves from between the electrodes 48 and 50 and enters the downstream region of diminishing magnetic field strength. The cooling material is introduced into passage 20 in conduit section 22 in such a manner as to effect cooling of at least a layer of the conductive mixture, such layer serving to interrupt electrical conductivity transversely through passage 20. Or, if preferred, additional tubes, such as a tube 104, may be provided and if they are suitably disposed circumferentially with respect to conduit section 22, substantially the entire mixture passing through the downstream region of diminishing magnetic field strength could be rendered electrically nonconductive.

FIG. 5 discloses a second embodiment of the present invention incorporated in an MHD electrical generator 10a which, it is to be understood, is similar in all respects to generator 10 hereinbefore described except as hereinafter explained. Generator 10a differs from generator 10 in that the former is not provided with vanes or members such as those designated 74 and 76. Furthermore, generator 10a is provided with a pair of tubes 70a and 72a having passages 66a and 68a, respectively, which are axially disposed and are of such size and shape that seeding material from a source (not shown) passes through them, enters a throat 16a in a transition section 18a, and is dispersed in regions designated 84a and 86a, respectively, to mix with the hot gas from a combustion chamber 14a of a burner 12a therein. Hot gas moving through a region 88a is not immediately mixed with seeding material and, consequently, maintains region 88a as an electrically nonconductive zone between the electrically conductive regions 84a and 86a. For purposes of illustration nonconductive region 88a is shown as being generally wedge shaped and bounded on two sides by planes having edges depicted by dotted lines 90a and 92a. While the particular configuration of nonconductive region 88a is not important, it is important that the region be coextensive with the upstream region of diminishing magnetic field strength and that it terminate substantially at the plane in which the upstream ends of the electrodes 48a and 50a terminate; such plane having an edge depicted by the dotted line 94a in FIG. 5.

FIGS. 6 and 7 disclose a third embodiment of the present invention incorporated in an MHD electrical generator 10b which, it is to be understood, is similar in all respects to generator 10 hereinbefore described except as hereinafter explained. Generator 10b differs from generator 10 in that throat 16b of the former is provided with a tubular member 74b having a passage 76b therein and a plurality of holes 78b communicating therewith on the downstream side of the member. Member 74b is disposed so that the longitudinal axis thereof is substantially parallel to the path of the magnetic flux field and is transverse to the normal path between the electrodes 48b and 50b. It is to be understood that passage 76b in tubular member 74b is adapted for connection to a source of seeding material which, for example, may be similar to source 64 hereinbefore described in connection with generator 10. Tubular member 74b is so disposed and the holes 78b therein are of such size, shape and disposition that when seeding material is supplied to the tubular member it flows therefrom and is dispersed into a region designated by the numeral 88b and defined by the dotted lines 90b and 92b to maintain that region electrically conductive. However, the regions 84b and 86b in throat 16b are maintained substantially nonconductive.

The first embodiment of the invention shown in FIGS. 1, 2, 3 and 4 and hereinbefore described operates in the following manner.

Fuel reactants from the sources 32 and 34 are introduced under pressure through the passages 24 and 26, respectively, in the tubes 28 and 30, respectively, into combustion chamber 14 of burner 12 and are burned therein to produce a supply of gas, heated to about 5400° F., which is expelled at high velocity through the spaces 78, 80 and 82 in throat 16 of transition section 18 into passage 20 in conduit section 22 of generator 10.

Simultaneously, seeding material from source 64 is introduced under pressure through the passages 66 and 68 in the tubes 70 and 72, respectively, into the spaces 78 and 82, respectively, in throat 16 of transition section 18 and mixes with the hot gas passing therethrough. Mixing of the seeding material with the hot gas is attended by ionization of the seeding material and an electrically conductive fluid mixture is thereby produced. Due to the configuration of throat 16 of transition section 18, the size, shape and disposition of the vanes 74 and 76 therein, and aerodynamic conditions in the throat, the electrically conductive fluid mixture is dispersed into the regions 84 and 86 and subsequently into passage 20 in conduit section 22. It is to be noted, however, that the hot gas moving through space 80 and through region 88 is not mixed with seeding material and is, therefore, substantially nonconductive. Thus, the hot gas moving through region 88 serves as an electrical insulating barrier between the two regions 84 and 86 which contain the electrically conductive fluid mixture. As a result, electrical conductivity across fluid stream upstream of a plane 94 (see FIG. 3) in a direction parallel to that plane and transverse to the direction of arrow 42 (see FIG. 2) is relatively low. This zone of low electrical conductivity in the fluid stream coincides with the upstream region of diminishing magnetic field strength, and as a result, end losses which would normally occur if the fluid stream were continuously conductive thereacross are forestalled or substantially reduced.

It will be understood, however, that the fluid stream moving between the electrodes 48 and 50 is continuously conductive thereacross because downstream of plane 94 (see FIG. 3) the ionized seeding material is well distributed throughout the hot gas. Accordingly, movement of the electrically conductive fluid mixture through the magnetic flux field and between the electrodes 48 and 50 results in electrical current flow through the gas stream in the direction of arrow 62 shown in FIG. 2. Thus, electrons flow from electrode 50 through conductor wire 60, load 56 and conductor wire 58 to electrode 48.

As the mixture of gas and seeding material moves past the downstream ends of the electrodes 48 and 50 and into the downstream region of diminishing magnetic field strength, it normally is still electrically conductive even though some heat energy has been lost for various reasons. Accordingly, end losses would normally tend to occur. However, in accordance with the invention, these end losses are forestalled or substantially reduced by introducing cooling material from source 100 through passage 102 in tube 104 into passage 20 in conduit section 22 of generator 10. The cooling material mixes with portions of the electrically conductive mixture of hot gas and ionized seeding material passing through the downstream region of diminishing magnetic field strength and reduces the temperature thereof sufficiently to effect substantial deionization of the seeding material thereby rendering those portions of the mixture substantially nonconductive. As will be understood, that portion of the mixture which is rendered electrically nonconductive serves as an electrical insulating barrier for interrupting electrical conductivity across the fluid stream in a direction transverse to the direction of arrow 42 (see FIG. 2) and parallel to the plane in which the downstream ends of the electrodes 48 and 50 terminate.

The second embodiment of the invention shown in FIG. 5 and hereinbefore described operates in the following manner.

Hot gas from combustion chamber 14a of burner 12a is expelled at high velocity through throat 16a of transition section 18a into passage 20a in conduit section 22a in generator 10a.

Simultaneously, seeding material is introduced under pressure through the passages 66a and 68a in the tubes 70a and 72a, respectively, into throat 16a of transition section 18a. Due to the configuration of throat 16a of transition section 18a, the size, shape and disposition of the passages 66a and 68a in the tubes 70a and 72a, respectively, and aerodynamic conditions within the throat, mixing of the seeding material and the hot gas and ionization of the former occur in the regions 84a and 86a and beyond but not in region 88a. Accordingly, the mixture of hot gas and ionized seeding material moving through the regions 84a and 86a is electrically conductive whereas the hot gas moving through region 88a is substantially nonconductive and serves as an electrical insulating barrier between the two regions 84a and 86a. As a result, electrical conductivity across the fluid stream upstream of plane 94a (see FIG. 5) in a direction parallel to that plane and parallel to a path between the electrodes 48a and 50a is relatively low. This zone of low electrical conductivity in the fluid stream coincides with the upstream region of diminishing magnetic field strength in generator 10a, and as a result, end losses which would normally occur if the fluid stream were continuously conductive thereacross are forestalled or substantially reduced.

The third embodiment of the invention shown in FIGS. 6 and 7 and hereinbefore described operates, as regards the generating of electrical power, in the same manner as the generators 10 and 10b, hereinbefore described. Seeding material is introduced under pressure through passage 76b in tubular member 74b and is expelled through the holes 78b into region 88b where it mixes with the hot gases moving therethrough thereby rendering that region electrically conductive. However, the hot gas moving through the regions 84b and 86b is nonconductive and these regions serve as electrical insulating barriers. As a result, electrical conductivity across the fluid stream in that vicinity is relatively low.

It is to be understood that the generators 10a and 10b, as regards the generation of electrical power, operate in the same manner as generator 10, hereinbefore described. It is to be further understood that end loss effects normally tending to occur in the downstream region of diminishing magnetic field strength (not shown) in the generators 10a and 10b are forestalled or reduced by the same means and in the same manner as disclosed herein in connection with generator 10.

It will be apparent to those skilled in the art that, if circumstances so require, the means disclosed herein for substantially reducing end loss effects in the upstream and downstream regions of diminishing magnetic field strength could be employed separately.

What is claimed is:

1. In apparatus for transforming energy in a stream of fluid into electrical energy, in combination, a stream of fluid, electrode means of predetermined length between which said stream of fluid is adapted to move, means for providing a magnetic field through which said stream of fluid is adapted to move, said magnetic field being coextensive lengthwise with said electrode means and having a downstream region of diminishing field strength extending beyond the downstream end of said electrode means, means for introducing seeding material into said stream of fluid to provide an electrically conductive mixture of fluid and seeding material for passage between said electrode means, said means for introducing seeding material into said stream of fluid comprising at least one member for deflecting said seeding material after it enters said stream of fluid to control its dispersion in the stream of fluid, and means for introducing material into the said electrically conductive mixture of fluid and seeding material near the downstream end of said electrode means but upstream of the downstream region of diminishing field strength to render said mixture substantially less conductive.

2. In apparatus for transforming energy in a stream of fluid ito electrical energy, in combination, conduit means for conducting a stream of hot fluid, electrode means of predetermined length within said conduit means and between which said stream of hot fluid is adapted to move, means for providing a magnetic field within said conduit means through which said stream of hot fluid is adapted to move, said magnetic field being coextensive lengthwise with said electrode means and having an upstream region of diminishing field strength extending beyond the upstream end of said electrode means, means for introducing seeding material into said stream of hot fluid in said conduit means upstream of said electrode means, and means for first effecting dispersion of said seeding material transversely through the stream of fluid near the upstream end of said electrode means but downstream of the upstream region of diminishing field strength, said means for first effecting dispersion comprising at least one member in said conduit for deflecting said seeding material after it enters said stream of fluid, said seeding material being adapted to ionize when introduced into said stream of hot fluid to render the fluid with which it is mixed electrically conductive.

3. In an MHD electrical power generator, in combination, a stream of fluid, means for providing a magnetic field through which said fluid moves, said magnetic field being characterized at either end by regions of diminishing field strength, means upstream of said magnetic field for introducing seeding material into said stream of fluid, means for first effecting dispersion of said seeding material transversely through said stream of fluid immediately downstream of the upstream region of diminishing field strength of said magnetic field, said means for first effecting dispersion of said seeding material comprising at least one member for deflecting said seeding material, and means for introducing cooling material into said stream of fluid and for first effecting dispersion of said cooling material transversely through said stream of fluid immediately upstream of the downstream region of diminishing field strength of said magnetic field.

4. In an MHD electrical power generator, in combination, a stream of fluid, means for providing a magnetic field through which said fluid moves, said magnetic field being characterized at either end by regions of diminishing field strength, means upstream of said magnetic field for introducing seeding material into said stream of fluid, and means for first effecting dispersion of said seeding material transversely through said stream of fluid immediately downstream of the upstream region of diminishing field strength of said magnetic field, said means for first effecting dispersion of said seeding material comprising at least one member for deflecting said seeding material.

References Cited by the Examiner

UNITED STATES PATENTS

| 1,717,413 | 6/1929 | Rudenberg | 310—11 X |
| 2,210,918 | 8/1940 | Karlovitz | 310—11 |
| 3,154,703 | 10/1964 | Zahavi | 310—11 |

FOREIGN PATENTS 1,161,079  3/1958  France.

OTHER REFERENCES

Publication: "Magnetohydrodynamic Generators," by Way, Westinghouse Engineer, July 1960, pp. 105–107.

Publication: "MHD Power Generation Using Nuclear Fuel," by Avco Everett Research Laboratory, Everett, Massachusetts, March 1960, pp. 6 and 16.

MAX L. LEVY, *Primary Examiner.*

ORIS L. RADER, MILTON O. HIRSHFIELD, D. X. SLINEY, *Examiners.*